United States Patent [19]
Alexandre

[11] 4,450,922
[45] May 29, 1984

[54] FORCE SENSING DEVICE FOR MEASUREMENT APPARATUS

[75] Inventor: Claude Alexandre, Paris, France

[73] Assignee: R.M.S. Ingenierie et Financiere, Saint Maur, France

[21] Appl. No.: 356,535

[22] Filed: Mar. 9, 1982

[30] Foreign Application Priority Data

Mar. 17, 1981 [FR] France ................... 81 05281

[51] Int. Cl.³ .......................... G01G 3/14; G01G 3/08; G01L 1/22
[52] U.S. Cl. .................................... 177/211; 177/229; 73/862.65
[58] Field of Search .................. 177/211, 229; 73/862.65

[56] References Cited

U.S. PATENT DOCUMENTS 3,495,669  2/1970  Yeager et al.
4,143,727  3/1979  Jacobson .................. 177/211

FOREIGN PATENT DOCUMENTS 2386024  3/1978  France.
2431689  7/1978  France.

Primary Examiner—George H. Miller, Jr.
Attorney, Agent, or Firm—Karl W. Flocks; A. Fred Starobin; Sheridan Neimark

[57] ABSTRACT

A force sensing apparatus comprising a parallelepipedic block (1) having an application area (2) and a reception area (8) for the force to be measured thereby, upper transverse openings (10,11) connected by a slot (14) and lower transverse openings (12,13) connected by a slot (15). The transverse openings (10,11,12,13) determine zones of lesser strength (20,21) and vertical slots (25,26) determine a zone of lesser strength (35) therebetween, the minimum thickness of which is located on the axis X—X of the zones of lesser strength (20,21) determined by the openings (10,11,12,13).

6 Claims, 2 Drawing Figures

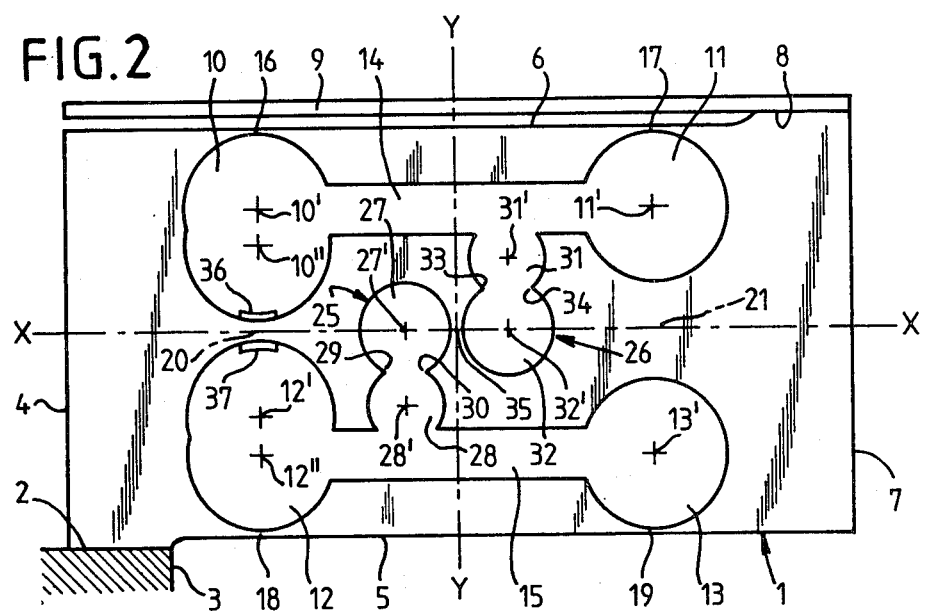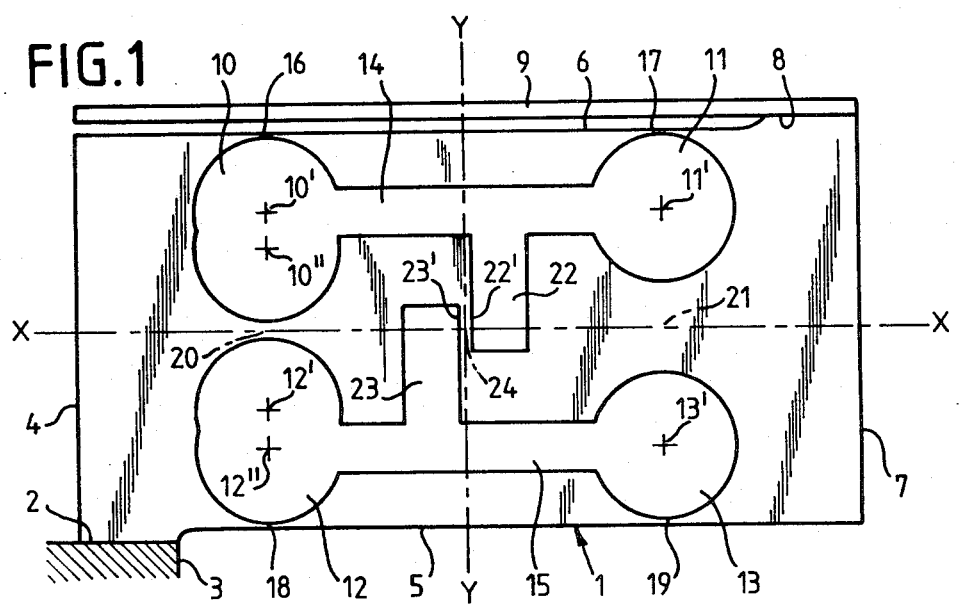

FORCE SENSING DEVICE FOR MEASUREMENT APPARATUS

The present invention relates to a force sensing device for measurement apparatus such as a weighing instrument.

The weighing instruments with platens having arms in the form of an articulated parallelogram are expensive and fragile. Therefore, force sensing devices have been proposed, consisting of a parallelepipedic block formed with openings and slots defining thinner sections of lesser strength whose deformation is measured for example by means of a stress gauge under the action of the mass to be weighed. The force sensing devices of the above mentioned type generally comprise a cantilevered application area located at one end of the block on the lower face thereof and a reception area for the force to be measured located on the upper face thereof adjacent the opposite end.

The main disadvantage of such sensing devices is that they are sensitive to flexural moments produced by off-centered forces.

At the present time there can be found devices for coping with such disadvantages. Such devices are generally made of materials of differing nature, require variations in transverse thickness and imply complicated machining operations. Their realization is therefore always difficult and expensive.

The object of the invention is a force sensing device of the above-mentioned type which permits accurate measurements independent of the position of the load on the reception area for the force to be measured, while being simple and little expensive to manufacture.

According to the invention, there is provided a force sensing device for measurement apparatus such as a weighing instrument, of the type comprising an homogeneous parallelepipedic block substantially symmetrical in relation to three perpendicular axes X—X, Y—Y and Z—Z, having a front face and a back face perpendicular to axis Z—Z, a lower side and an upper side perpendicular to axis Y—Y and a first vertical side and a second vertical side perpendicular to axis X—X, with means for fixation of said block to a support near said first vertical side and connecting means between said block and a reception plate for the force to be measured near said second vertical side, in said block being provided without any thinning along axis Z—Z, near said first vertical side a first upper transverse opening and a first lower transverse opening determining a first middle thinner zone, and near said second vertical side a second upper transverse opening and a second lower transverse opening determining a second middle thinner zone, said middle thinner zones being symmetrical in relation to axis X—X, said upper and lower transverse openings being connected respectively by an upper horizontal slot and a lower horizontal slot, in said block being also provided between said horizontal slots a first vertical slot opening in said lower horizontal slot and a second vertical slot opening in said upper horizontal slot, said vertical slots being horizontally off-set, wherein said vertical slots determine a single vertical thinner zone of lesser resistance therebetween, said vertical thinner zone having a minimum thickness in the plane of axes X—X and Z—Z.

In the device according to the invention the first middle thinner zone between said first upper and lower openings is only submitted to vertical components of forces exerted upon said reception plate for said forces thereby improving insensitivity of the device to effects from off-centered loads.

A first form of embodiment provides a device according to the invention wherein the vertical slots have a parallelepipedic form and are parallel to one another.

A second form of embodiment provides a device wherein each of said vertical slots is constituted by two substantially cylindrical channels having axes which are parallel and located in the same vertical plane, said channels intersecting along two transverse inner edges.

The invention will be better understood in the light of the following detailed description with reference to the attached non-limitative exemplifying drawings illustrating two forms of embodiment of the invention:

FIG. 1 is a lateral view of a force sensing device according to a first form of embodiment of the invention;

FIG. 2 is a lateral view of a force sensing device according to a second form of embodiment of the invention.

A force sensing device as illustrated by FIGS. 1 and 2 comprises an homogeneous metallic block 1 having the form of a rectangular parallelepiped with a length as measured along an horizontal axis X—X greater than a height as measured along a vertical axis Y—Y, said height being greater than a width as measured along an axis Z—Z at right angles to said axes X—X and Y—Y. Said block 1 is substantially symmetrical in relation to said three axes; it comprises a front face and a back face, a first vertical side 4, a lower side 5, an upper side 6, and a second vertical side 7. On said lower side 5, near said first vertical side 4, an application area 2 is provided with means (not shown) for its fixation to a support 3. On said upper side 6, near said second vertical side 7, a reception area 8 is provided with connection means (not shown) for connecting a plate 9 for receiving the force to be measured to said block 1.

Said block 1 comprises a first upper transverse opening 10 and a first lower transverse opening 12 located near said first vertical side 4, and a second upper transverse opening 11 and a second lower transverse opening 13 located near said second vertical side 7. Said transverse openings are disposed in a rectangular array. Said upper transverse openings 10, 11 are connected by an upper horizontal slot 14; they determine with said upper side 6 of said block 1 a first upper thinner zone 16 and a second upper thinner zone 17. Said lower openings 12, 13 are connected by a lower horizontal slot 15; they determine with said lower side 5 of said block 1 a first lower thinner zone 18 and a second lower thinner zone 19. The width of said upper and lower thinner zones as measured along axis Y—Y is the same. Said first openings 10, 12 and said second openings 11, 13 determine therebetween, respectively, a first middle thinner zone 20 and a second middle thinner zone 21; said middle thinner zones are symmetrical in relation to a plane comprising said axes X—X and Z—Z.

The first openings 10 and 12 have preferably larger dimensions than second openings 11 and 13 such that the first middle thinner zone 20 is of a smaller thickness than the second middle thinner zone 21. Thus, sensitivity of block 1 is increased while preserving satisfactory rigidity.

The second transverse openings 11 and 13 consist of cylindrical channels having axes 11' and 13' which are parallel to one another and located in the same vertical plane. Each first opening 10, 12 consists of two cylindrical intersecting channels having axes 10', 10" for the opening 10 and 12', 12" for the opening 12, respectively, which are parallel to one another and located in the same vertical plane.

Block 1 also comprises two vertical slots 22, 23, 25, 26 horizontally off-set on either side of said vertical axis Y—Y and located between said horizontal slots 14, 15. A first vertical slot 23, 25 opens into said lower horizontal slot 15 near said first lower transverse opening 12, and a second vertical slot 22, 26 opens into said upper horizontal slot 14 near said second upper transverse opening 11. Said vertical slots 22, 23, 25, 26 determine therebetween a single vertical thinner zone 24, 35 of lesser resistance, which is symmetrical in relation to said three axes X—X, Y—Y and Z—Z.

No transverse thinning along axis Z—Z is effected.

In the form of embodiment shown on FIG. 1 said vertical slots 22, 23 are parallel to one another and have a parallelepipedic configuration. They determine therebetween a single vertical thinner zone 24, the width of which is constant as measured along axis X—X.

On FIG. 2 said vertical slots 25, 26 are only constituted with cylindrical transverse channels. Said first vertical slot 25 consists of a first middle channel 27 and a lower channel 28 intersecting said first middle channel 27 along two first transverse inner edges 29, 30, and said second vertical slot 26 consists of a second middle channel 32 and an upper channel 31 intersecting said second middle channel 32 along two second transverse inner edges 33, 34. Said channels of each vertical slot have axes 28', 27', 32', 31' which are parallel to axis Z—Z and are located in two vertical planes symmetrical in relation to a vertical plane comprising axes Y—Y and Z—Z. Said middle channels 27, 32 have axes 27', 32' which pass through axis X—X. Said middle channels 27, 32 have a larger diameter than said upper and lower channels 31, 28; they determine a vertical thinner zone 35 therebetween which is symmetrical in relation to said three axes X—X, Y—Y and Z—Z, the width of which being minimal in a plane comprising axes X—X and Z—Z.

As already known stress gauges 36, 37 mounted in first openings 10 and 12 and associated with a suitable electrical circuit (not shown) supply a signal proportional to the only vertical efforts to be measured, which cause parallelogrammic deformation of block 1.

In the direction of the thickness along axis Z—Z, the block 1 was sufficiently dimensioned so that due to its inertial moment the effects from the moments generated by a transversely off-centered load may become negligible.

It can be noted that some features of the measurement are affected by the ratio of the dimensions of the zones 16, 17, 18, 19 of the frame of the parallelogram, on the one hand, and on the other, the dimensions of the central parts. Such a sensor can therefore produce different performances, by varying these dimensions, so as to be suited to the needs.

The structure of such a force sensing device according to the invention, with a single vertical thinner zone, without any thinning along axis Z—Z, leads to a substantial reduction of the manufacturing steps, and their cost, in relation to prior devices. This manufacturing is even easier in the preferred embodiments of the invention illustrated by FIGS. 1 and 2 because they require a single kind of machining, leading respectively, as far as the vertical thinner zone is concerned, to parallelepipedic slots only or to cylindrical channels only, whereas this wise simplification does not affect the elimination of the effect of the off-centered forces.

It will be understood that this invention is not limited to the forms of embodiment as described and represented and may be modified according to many variations as available to the man of the art, depending on the intended applications, without departing from the scope of the invention. In particular the securing of the block to the support and the linking of the plate for receiving the force to be measured to said block may be effected on the vertical sides or near them without departing from the scope of the invention.

I claim:

1. In a force sensing device for measuring a vertical force comprising a homogeneous parallelepipedic block of constant thickness having front and back faces, lower and upper sides and first and second vertical sides, said block being provided with:

first upper and lower transverse openings near said first vertical side determining first upper, middle and lower thinner zones of lesser dimension as measured along a vertical axis, second upper and lower transverse openings near said second vertical side determining second upper, middle and lower thinner zones of lesser dimension as measured along a vertical axis, said first and second middle thinner zones being symmetrical in relation to a plane parallel with said upper and lower sides, upper and lower horizontal slots connecting said first and second upper transverse openings and said first and second lower transverse openings, respectively, a first vertical slot near said first lower transverse opening connected with said lower horizontal slot, a second vertical slot near said second upper opening connected with said upper horizontal slot, and a central portion determined by said vertical slots, said force sensing device further comprising first means for securing thereof to a support near said first vertical and lower sides, second means for securing of said device to a reception plate on which forces to be measured are to be exerted, and stress gauges located on said first middle thinner zone, the improvement being said central portion determined by said horizontally offset vertical slots comprises a single vertical thinner zone of lesser dimension as measured along an axis at right angles with said vertical sides, said vertical thinner zone having a minimum thickness in said plane of symmetry of said first and second middle thinner zones.

2. A device according to claim 1, wherein said vertical slots are parallel and have a parallelepipedic configuration.

3. A device according to claim 1, wherein said first and second vertical slots consists respectively of two middle and lower intersecting channels and of two middle and upper intersecting channels, said channels of each of said vertical slots being substantially cylindrical, and having axes parallel and located in a same vertical plane.

4. A device according to claim 3, wherein the axes of said middle channels pass through the aforementioned said axis at right angles with said vertical sides.

5. A device according to claim 1, wherein said first transverse openings have large dimensions than said second transverse openings, said first middle thinner zone being thinner than said second middle thinner zone.

6. A device according to claim 5, wherein each of said first transverse openings consists of two cylindrical intersecting channels, having identical diameters and having axes located in a same vertical plane.

* * * * *